United States Patent
Kao et al.

(10) Patent No.: US 8,699,211 B2
(45) Date of Patent: Apr. 15, 2014

(54) PERIPHERAL DEVICE FOR PORTABLE ELECTRONIC DEVICE

(75) Inventors: Kung-Ming Kao, New Taipei (TW); Jui-Hsiang Lin, New Taipei (TW)

(73) Assignee: Chi Mei Communication Systems, Inc., New Taipei (TW)

( * ) Notice: Subject to any disclaimer, the term of this patent is extended or adjusted under 35 U.S.C. 154(b) by 6 days.

(21) Appl. No.: 13/526,120

(22) Filed: Jun. 18, 2012

(65) Prior Publication Data

US 2013/0077213 A1  Mar. 28, 2013

(30) Foreign Application Priority Data

Sep. 22, 2011  (TW) .................................. 100134182

(51) Int. Cl.
*H05K 5/00*  (2006.01)
*H05K 7/00*  (2006.01)

(52) U.S. Cl.
USPC ............... 361/679.01; 361/679.05; 455/575.1

(58) Field of Classification Search
USPC ............. 361/679.01, 679.02, 679.04, 679.08, 361/679.09, 679.11, 679.14, 679.15, 361/679.16, 679.17, 679.2, 679.23, 679.26, 361/679.27, 679.28, 679.3, 679.55, 679.56
See application file for complete search history.

(56) References Cited

U.S. PATENT DOCUMENTS

| 2009/0021899 A1* | 1/2009 | Chen ............................. 361/680 |
| 2009/0147451 A1* | 6/2009 | Yeh ........................... 361/679.01 |
| 2011/0234069 A1* | 9/2011 | Chen et al. ................. 312/319.1 |

* cited by examiner

*Primary Examiner* — Robert J Hoffberg
*Assistant Examiner* — Michael Matey
(74) *Attorney, Agent, or Firm* — Novak Druce Connolly Bove + Quigg LLP

(57) ABSTRACT

A peripheral device includes a slide mechanism, and a first and second extension portions having a number of function modules. The first and second extension portions are fixed to the slide mechanism and slide relative to each other in an opened position or closed position driven by the slide mechanism.

12 Claims, 6 Drawing Sheets

PERIPHERAL DEVICE FOR PORTABLE ELECTRONIC DEVICE

BACKGROUND

1. Technical Field

The disclosure generally relates to peripheral devices for portable electronic devices, and particularly to a peripheral device providing extend functions such as playing games or playing music, for example, for a portable electronic device.

2. Description of Related Art

To satisfy requirements of users, designs of portable electronic devices such as mobiles, and personal digital assistant (PDAs) tend to be more diversified. For example, the portable electronic devices may have other functions such as games, digital TV, playing music or taking phones besides conventional communication functions.

However, when the portable electronic device becomes multi-functional, the amount of elements needed for the portable electronic device to realize these functions increases. A weight and volume of the portable electronic devices may be increased so that the portable electronic devices may become inconvenient for users to carry or use.

Therefore, there is room for improvement within the art.

BRIEF DESCRIPTION OF THE DRAWINGS

Many aspects of the present disclosure can be better understood with reference to the following drawings. The devices in the drawings are not necessarily drawn to scale, the emphasis instead being placed upon clearly illustrating the principles of the disclosure.

DETAILED DESCRIPTION

Figure 1:
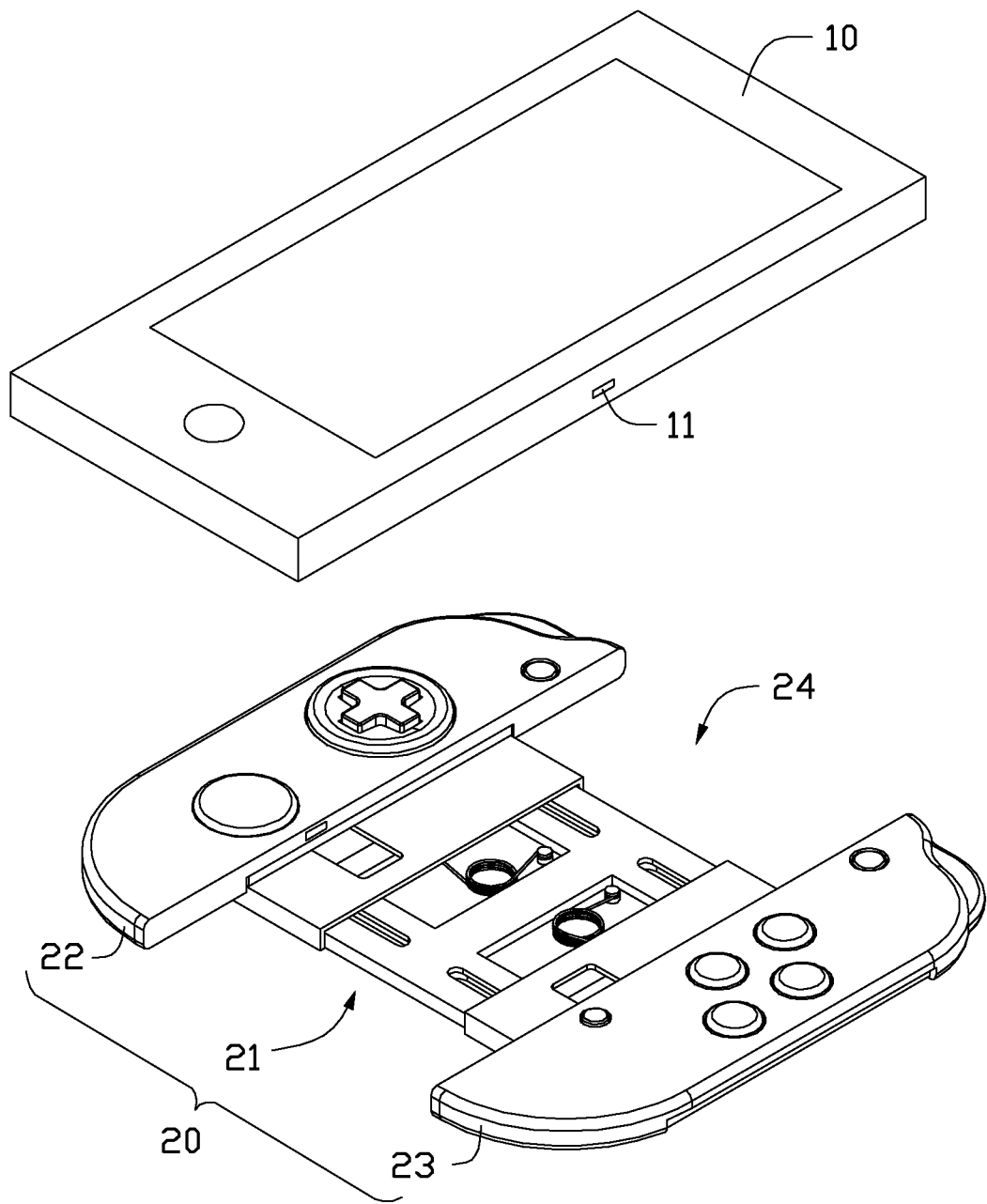
FIG. 1 is a schematic view of a peripheral device for a portable electronic device, according to an exemplary embodiment of the disclosure.

FIG. 1 is a schematic view of a peripheral device 20 for a portable electronic device 10, according to an exemplary embodiment of the disclosure. The portable electronic device 10 may be a mobile phone or a PDA. The portable electronic device 10 includes two first connectors 11.

Figure 2:
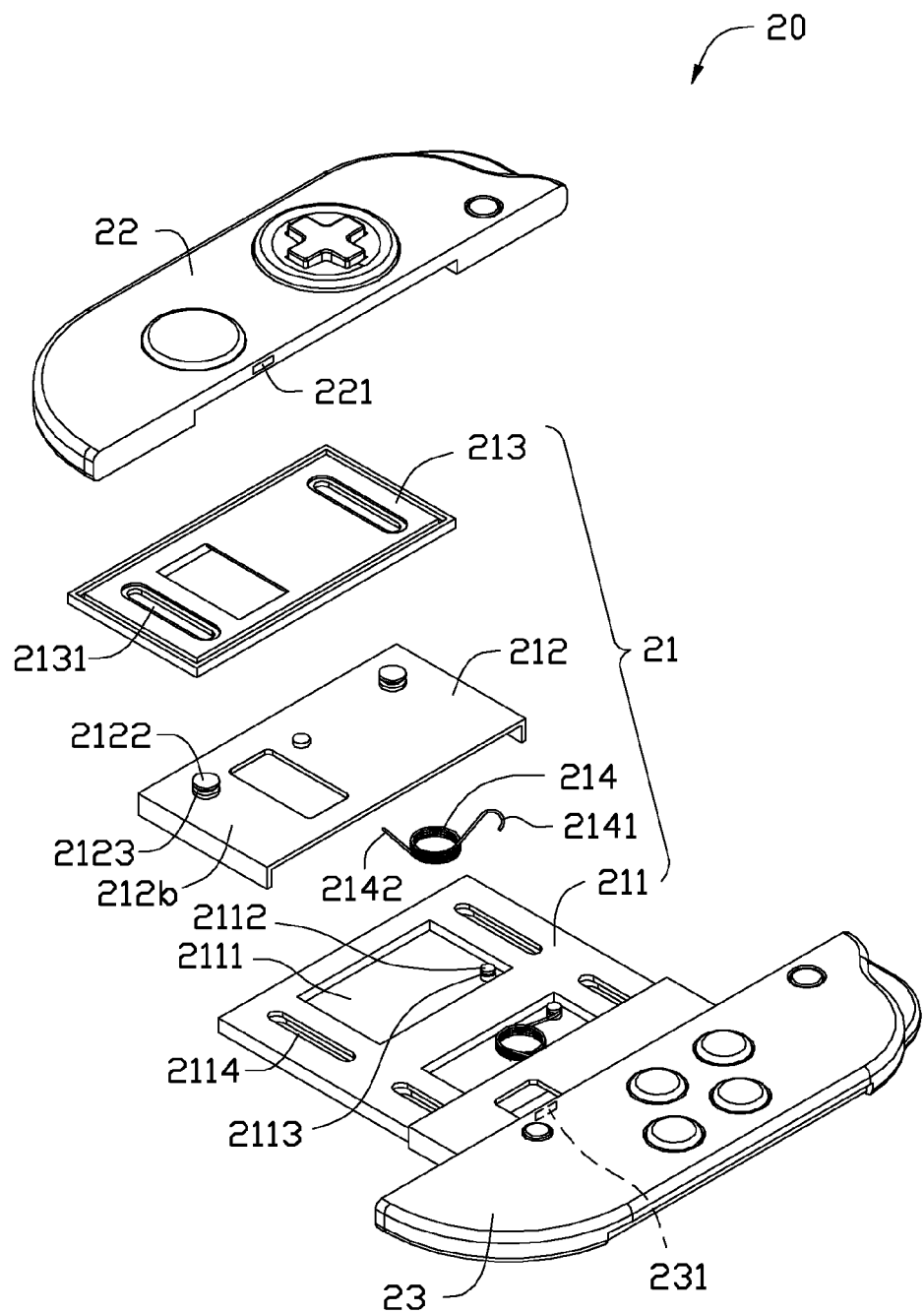
FIG. 2 is a partially exposed view of the peripheral device of the FIG. 1.
Figure 3:
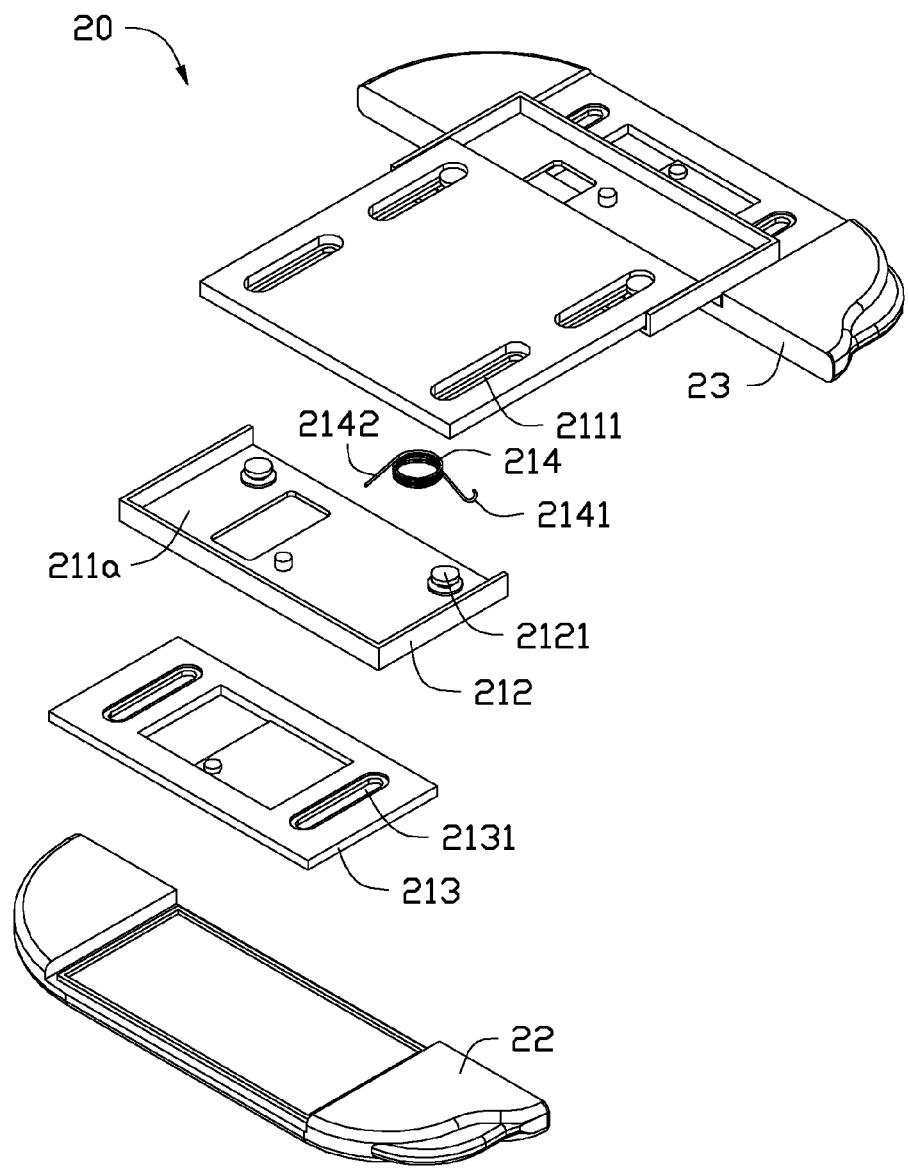
FIG. 3 is similar to FIG. 2, but showing the peripheral device from another aspect.

Referring to FIGS. 2 and 3, the peripheral device 20 includes a slide mechanism 21, a first extension portion 22, and a second extension portion 23.

The slide mechanism 21 includes a base plate 211, two first slide plates 212, two second slide plates 213 and two elastic members 214.

The base plate 211 is a substantially rectangular plate. Two rectangular recessed portions 2111 are symmetrically formed on the base plate 211 to respectively receive one of the elastic members 214. Each recessed portion 2111 includes a positioning post 2112 protruding from a corner of each recessed portion 2111. A mounting slot 2113 is defined in each positioning post 2112 to secure the elastic member 214. A group of first slide grooves 2114 are respectively defined at two opposite sides of each recessed portion 2111 to slidably mount one of the first slide plates 212.

Each first slide plate 212 is substantially rectangular. Each first slide plate 212 includes a first surface 212a facing the base plate 211 and a second surface 212b opposite to the first surface facing the second slide plate 213. A group of first slide posts 2121 (shown in FIG. 3) protrudes from the first surface 212a corresponding to the first slide grooves 2114. The first slide posts 2121 are slidably received in the first slide grooves 2113. Thus, the first slide plates 212 are slidably mounted to the base plate 211. A group of second slide posts 2122 protrude from the second surface 212b.

Each second slide plate 213 is substantially rectangular. Each second slide plate 213 defines a group of second slide grooves 2131 corresponding to the second slide posts 2122. The second slide posts 2122 are slidably received in the second slide grooves 2131. Thus, the two second slide plates 213 are respectively slidably mounted to the two first slide plates 212. To avoid the first and second slide posts 2121, 2122 from disengaging from the first slide and second slide grooves 2114, 2131, a fixing slot (not labeled) is defined in each slide post, an inner wall (not labeled) of each slide groove latches into the fixing slot of the corresponding slide post.

Each elastic member 214 is a torsion spring positioned between the base plate 211 and the first slide plate 212. Each elastic member 214 includes a first fixing portion 2141 and a second fixing portion 2142 at the ends. The first fixing portion 2141 is substantially a hook received in the mounting slot 2113 and partially surrounds the positioning post 2112. The second fixing portion 2142 is fixed to the first slide plate 212. When the first slide plates 212 are slid relative to the base plate 211 to an opened position (shown in FIG. 5), each elastic member 214 has a torsion force to drive the first slide plates 212 to slide back to a closed position (shown in FIG. 6) from the opened position.

The first extension portion 22 and the second extension portion 23 are configured for extending functions of the portable electronic device 10. Function modules such as an audio module, a camera module, a multiplayer control module, a gamer control module, a speaker, or a storage module can be set inside the first and second extension portions 22, 23. The first and second extension portions 22, 23 respectively include one of second connectors 221, 231 corresponding to the first connectors 11. The first and second extension modules 22, 23 are respectively fixed to the second slide plates 213. The first and second extension portions 22, 23 can slide relative to the base plate 211 by the first and second slide plates 212, 213.

Figure 4:
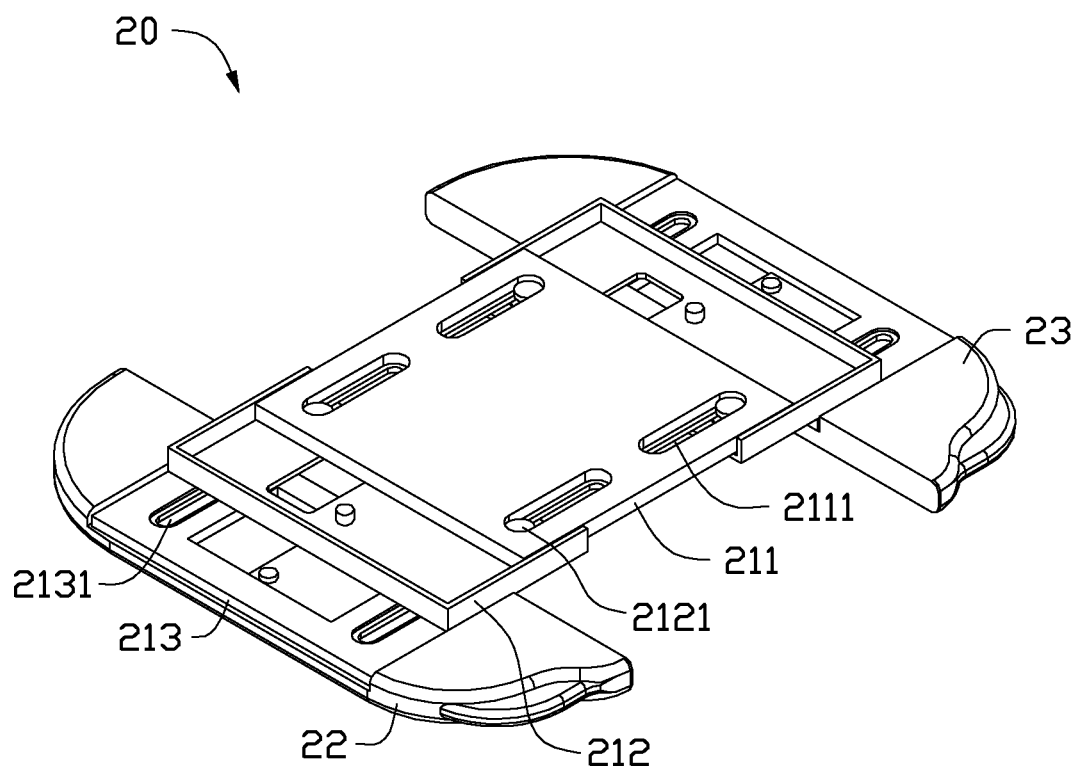
FIG. 4 is an assembled view of the peripheral device.

Also referring to FIG. 4, to assemble the peripheral device 20, the first slide posts 2121 are slidably received in the first slide grooves 2114. The second slide posts 2122 are slidably received in the second slide grooves 2131. The first extension portion 22 and the second extension portion 23 are respectively fixed to the second slide plates 213 with two second connectors 221, 231 facing each other. Each elastic members 214 is received in one of the recessed portions 2111 with the first fixing portion 2141 mounted in the mounting slot 2113 and the second fixing portion 2142 fixed to the first slide plate 212.

Figure 5:
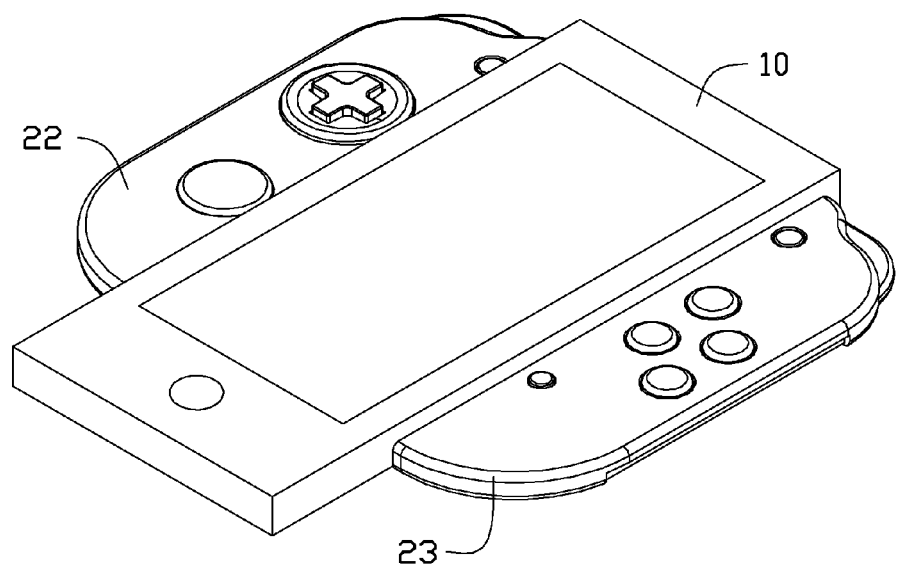
FIG. 5 is similar to FIG. 1, but showing the portable electronic device is attached to the peripheral device.
Figure 6:
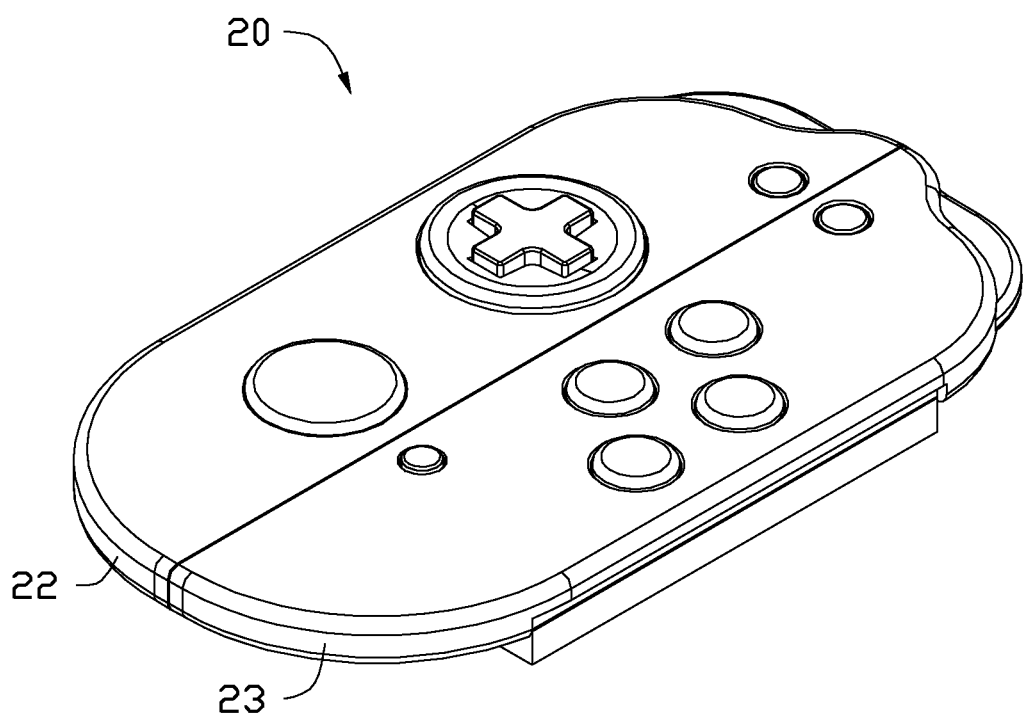
FIG. 6 is similar to FIG. 4, but showing the peripheral device in a closed position.

Referring to FIGS. 5 and 6, in use, to extend the peripheral device 20, the two first slide plates 212 and the two second slide plates 213 are slid relative to the base plate 211 to the opened position and form a receiving space 24 (shown in FIG. 1) between the first and second extension portions 22, 23. The portable electronic device 10 can be received in the receiving space 24 with the first connectors 11 electrically connected to the second connectors 221, 231. Thus, the function modules of the first and second extension portions 22 and 23 can be used by the portable electronic device 10. The peripheral device 20 provides multiple extension functions for the portable electronic device 10 without increasing the volume of the portable electronic device 10.

In addition, since each elastic member 214 has the torsion force to drive the first slide plates 212 to slide relative to the base plate 211 from the opened position to the closed position. The first and second extension portions 22, 23 can respectively abut against two sides of the portable electronic device 10 in the opened position and clamps the portable electronic device 10 to prevent the portable electronic device 10 from disengaging from the receiving space 24. When a user detaches the portable electronic device 10 from the receiving space 24, the elastic members 214 automatically drive the first slide plates 212 to slide relative to the base plate 22 from the opened position to the closed position. Thus, the volume of the peripheral device 20 is decreased to be convenient for the users to carry.

In other embodiments, the two second slide plates 213 can be omitted, the first and second extension portions 22, 23 are respectively fixed to the two first slide plate 212.

It is believed that the exemplary embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. A peripheral device, comprising:
a slide mechanism, the slide mechanism comprises a base plate and two first slide plates slidably assembled to the base plate, the base plate defines two groups of slide grooves, each first slide plate comprises two first slide posts corresponding to one group of the slide grooves, the first slide posts are slidably received in the first slide grooves;
a first extension portion; and
a second extension portion, wherein the first and second extension portions respectively fixed to the two first slide plates, and the first and second extension portions comprises a plurality of function modules, the first and second extension portions are fixed to the slide mechanism and slide relative to each other between an opened position and a closed position driven by the slide mechanism.

2. The peripheral device of claim 1, wherein the slide mechanism further comprises two elastic members, each elastic member is positioned between one of the first slide plates and the base plate, the elastic members drives the first slide plates to slide relative to the base plate from the opened position to the closed position.

3. The peripheral device of claim 1, wherein each first slide post defines a fixing slot, an inner wall of each first slide groove latches into the fixing slot.

4. The peripheral device of claim 1, wherein the slide mechanism further comprises two second slide plates slidably assembled to a respective one of the first slide plates, the first and second extension portions are respectively fixed to the respective one of the two second slide plates.

5. The peripheral device of claim 4, wherein the slide mechanism further comprises two elastic members, each elastic member is positioned between one of the first slide plates and the base plate, the elastic members drives the first slide plates to slide relative to the base plate from the opened position to the closed position.

6. The peripheral device of claim 1, wherein each first slide plate comprises a first surface facing the base plate and a second surface opposite to the first surface facing the second slide plate, the first slide posts protrude from the first surface, two second posts protrude from the second surface, each second slide plates defines two second slide grooves, the second slide posts are slidably received in the second slide grooves.

7. The peripheral device of claim 6, wherein each post of the first and second slide posts defines a fixing slot, an inner wall of each groove of the first and second slide groove latches into the fixing slot.

8. The peripheral device of claim 1, wherein the function modules comprises one of the group consisting of an audio module, a camera module, a multiplayer control module, a gamer control module, a speaker, and a storage module.

9. The peripheral device of claim 1, wherein the first and second extension portions further comprising at least one connector.

10. An electronic apparatus, comprising:
a portable electronic device; and
a peripheral device electrically connected to the portable electronic device, the peripheral device comprising:
a slide mechanism, the slide mechanism comprises a base plate and two first slide plates slidably assembled to the base plate; the base plate defines two groups of slide grooves, each first slide plate comprises two first slide posts corresponding to one group of the slide grooves, the first slide posts are slidably received in the first slide grooves;
a first extension portion; and
a second extension portion, wherein the first and second extension portions are respectively fixed to the two first slide plates, the first and second extension portions comprises a plurality of function modules, the first and second extension portions are fixed to the slide mechanism and slide relative to each other between an opened position and a closed position driven by the slide mechanism, the peripheral device defines a receiving space in the opened position, the portable electronic device is detachably received in the receiving space.

11. The electronic apparatus of claim 10, wherein the first and second extension portions clamp the portable electronic device when the portable electronic device is received in the receiving space.

12. The electronic apparatus of claim 11, wherein the slide mechanism further comprises two elastic members, each elastic member is positioned between one of the first slide plates and the base plate, the elastic members drives the slide plates to slide relative to the base plate from the opened position to the closed position.

* * * * *